A. V. CASSELS.
TROUSERS STRETCHER AND PRESSER.
APPLICATION FILED OCT. 27, 1920.
1,368,894.
Patented Feb. 15, 1921.
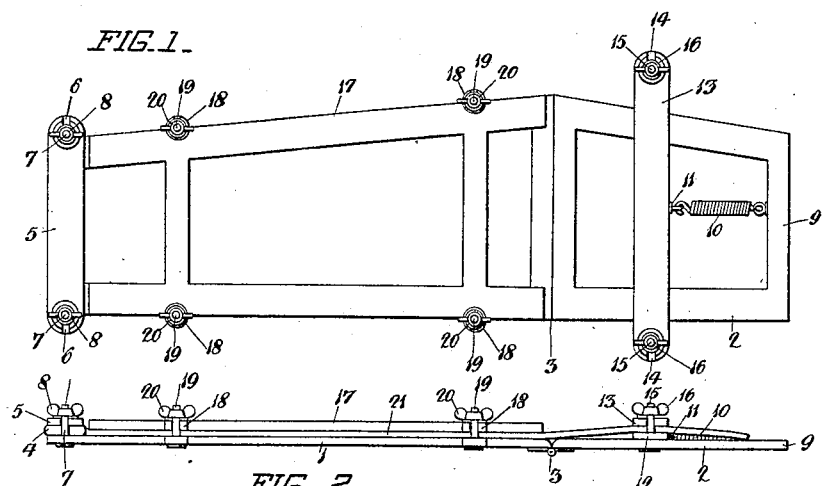
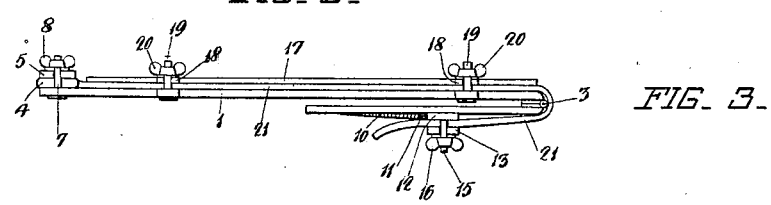
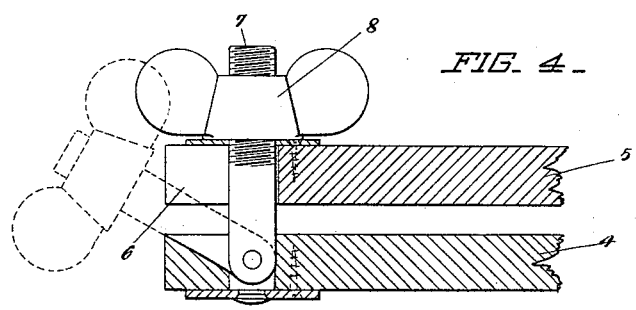
Inventor
A. V. Cassels
By H. R. Kerslake.
Attorney

UNITED STATES PATENT OFFICE.

ARNOLD VIVIAN CASSELS, OF WELLINGTON, NEW ZEALAND.

TROUSERS STRETCHER AND PRESSER.

1,368,894.  Specification of Letters Patent.  Patented Feb. 15, 1921.

Application filed October 27, 1920. Serial No. 419,998.

*To all whom it may concern:*

Be it known that I, ARNOLD VIVIAN CASSELS, a citizen of the Dominion of New Zealand, and residing at 122 Ghuznee street, Wellington, in the Provincial District of Wellington, in the Dominion of New Zealand, have invented certain new and useful Improvements in Trousers Stretchers and Pressers, of which the following is a specification.

This invention relates to trouser stretchers and pressers, and provides a comparatively cheap construction whereby trousers can be properly and efficiently stretched and pressed.

The device comprises a frame corresponding approximately to the shape of a trouser leg when laid out flat.

The member at one end of the frame is provided with a clamping bar, containing slots whereby said bar can be passed upon bolts projecting from said end member and be secured thereon by wing nuts.

The member at the other end of the frame has one end of a spring attached thereto, the other end of said spring being connected to a clamp comprising a pair of bars secured together by bolts and wing nuts and slidable on said frame.

The frame is divided nearer one end than the other into two portions, which are hinged together, the meeting edges of the parting bars being rounded.

A longitudinal clamp or frame is secured by bolts and wing nuts on the larger hinged portion of the frame.

The device will be more particularly described with reference to the accompanying drawing in which:—

Figure 1 is a plan view of the improved stretcher and presser,

Fig. 2 is an edge view showing a pair of trousers clamped in the device, while

Fig. 3 is a similar view to Fig. 2 but showing one portion turned under the other portion to stretch the trousers.

Fig. 4 is a detail view of a bolt and wing nut.

Referring to the drawing, 1 and 2 are the two portions of the frame, which when hinged together at 3 provide a shape resembling approximately the shape of a trouser leg laid out flat.

The cross bar 4 of the portion 1 is provided with a clamping bar 5, which is slotted at 6, so as to pass upon bolts 7 pivoted in the bar 4.

Wing nuts 8 screw on the bolts 7 for the purpose of clamping the bar 5 to the bar 4.

The bar 9 of the other portion 2 has one end of a spring 10 attached thereto, the other end of said spring being adapted to be connected to a hook 11 on a bar 12 slidable on said portion 2.

A bar 13 containing end slots 14 to receive bolts 15 pivoted in the bar 12 is capable of being clamped to the latter by wing nuts 16.

A frame 17 having lugs 18 slotted to receive bolts 19 pivoted in the portion 1, is capable of being clamped to the latter by wing nuts 20.

To use the device the frame 17 is removed and the spring 10 disconnected from the hook 11.

After folding the trousers 21 the lower ends of the legs, or the cuff bottoms thereof, are gripped between the bars 4 and 5.

The bars 12 and 13 are then caused to clamp the trousers near the top thereof, at a distance from the bar 9 sufficient to necessitate the spring 10 being put into tension to enable it to be connected to the hook 11, said spring 10 therefore causing the initial stretching of the trousers.

By having the hook 11 in the center of the bar 12, the latter adjusts itself to the resistance of the material, and enables the trousers to be stretched as required.

The trousers 21 are then fully stretched by turning the portion 2 under the portion 1, the spring 10 preventing said trousers from being overstretched, after which the frame 17 is clamped to the portion 1 by the bolts 19 and the wing nuts 20, the front and rear creases being formed by the trousers being gripped between the longitudinal bars of the frame 17 and portion 1.

What I do claim and desire to obtain by Letters Patent in United States is:—

1. A trouser stretcher and presser formed of two sections arranged end to end and pivotally connected together, one of said sections being provided at the end opposite the point of pivot with a detachable clamp bar, a presser element of substantially the same shape as the section carrying the clamp bar arranged on the clamp bar section between the clamp bar and the point of pivot and detachably connected to the clamp bar section, and a clamp bar carried by the other section and provided with resilient means for tensioning the last mentioned clamp bar.

2. A trouser stretcher and presser including an upper leg section and a lower leg section arranged end to end and pivotally connected together, the lower leg section being provided at its lower end with a clamp bar, a presser element superposed on the lower leg section between the clamp bar and the point of pivoting, the lower leg section and the presser element converging from the point of pivoting to the clamp bar, and a clamp bar carried by the upper leg section and resiliently connected to the upper leg section.

3. A trouser stretcher and presser comprising, a frame in two portions hinged together; a clamping bar at the outer end of one portion, and a frame adapted to be clamped on the latter; clamping bars slidable on the other portion and a spring between said bars and the outer end of the latter portion.

In testimony whereof I affix my signature in presence of two witnesses.

ARNOLD VIVIAN CASSELS.

Witnesses:
WILLIAM PINCHES,
MARY RIKINGTON.